United States Patent
Rao et al.

(10) Patent No.: US 7,197,632 B2
(45) Date of Patent: Mar. 27, 2007

(54) STORAGE SYSTEM AND CLUSTER MAINTENANCE

(75) Inventors: Sudhir G. Rao, Brooklyn, NY (US); Bruce M. Jackson, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/426,994

(22) Filed: Apr. 29, 2003

(65) Prior Publication Data

US 2004/0221149 A1 Nov. 4, 2004

(51) Int. Cl.
*G06F 15/177* (2006.01)

(52) U.S. Cl. ............................. 713/1; 713/100; 709/220

(58) Field of Classification Search .................... 707/8, 707/201, 202; 709/220–222; 713/1, 2, 100
See application file for complete search history.

(56) References Cited

U.S. PATENT DOCUMENTS

| | | | |
|---|---|---|---|
| 6,108,699 A * | 8/2000 | Moiin | 709/221 |
| 6,173,413 B1 * | 1/2001 | Slaughter et al. | 714/6 |
| 6,453,426 B1 * | 9/2002 | Gamache et al. | 714/4 |
| 6,662,219 B1 * | 12/2003 | Nishanov et al. | 709/220 |
| 6,966,060 B1 * | 11/2005 | Young et al. | 717/177 |
| 2004/0153841 A1 * | 8/2004 | Beck | 714/42 |

\* cited by examiner

*Primary Examiner*—Dennis M. Butler
(74) *Attorney, Agent, or Firm*—Lieberman & Brandsdorfer, LLC

(57) ABSTRACT

A method and system for maintaining a discovery record and a cluster bootstrap record is provided. The discovery record enables shared storage system discovery and the cluster bootstrap record enables cluster discovery and cooperative cluster startup. The cluster bootstrap record is updated in response to a change in the cluster membership. The update is performed by a cluster leader in the form of a transactionally consistent I/O update to the cluster bootstrap record on disk and a distributed cache update across the cluster (30, 50). The update is aborted (80) in the event of a failure in the cluster leaving the cluster bootstrap record in a consistent state. In the event of a disastrous cluster and/or storage system failure, the discovery record may be recovered (228) from a restored storage system (214) and the cluster bootstrap record may be reset to install a new cluster in the old cluster's place (232).

54 Claims, 12 Drawing Sheets

STORAGE SYSTEM AND CLUSTER MAINTENANCE

BACKGROUND OF THE INVENTION

1. Technical Field

This invention relates to a method and system for maintaining a storage system discovery record and a cluster bootstrap record in a cluster environment. More specifically, the invention relates to performing an update to the cluster bootstrap record in the event of a change in cluster membership, and recovery of the discovery record in the event of a disaster.

2. Description of the Prior Art

A cluster may be one node or, more commonly, a set of multiple nodes coordinating access to a set of shared storage subsystems typically through a storage area network. Each cluster will have one node that will function as a cluster leader to coordinate communication among nodes in the cluster. A cluster has cluster bootstrap information to enable nodes to join a cluster and to communicate across the cluster. Such information may include, cluster membership information, node identification information, node names, node identifiers, node IP addresses, as well as the last consistent state of a node in the cluster. In general, cluster bootstrap information is stored in a cluster bootstrap record by a cluster leader in a known location in the shared storage system.

Shared storage systems may come in various forms, including a storage area network and a back-end storage system. The shared storage includes a plurality of disks which may be accessible to each of the nodes in the cluster. The shared storage may be assigned to a single cluster or partitioned for multiple clusters. In a cluster environment, each node that is a member of the cluster has access to the shared storage media assigned to that cluster. If the shared storage is partitioned, then each node in the cluster will have access to the storage media assigned to the partition. One disk in the shared storage is generally designated as a master disk for the cluster. Within the cluster a discovery record is generally maintained in a known location on a local storage media for each node and is accessible by the associated node. The discovery record generally includes disk and cluster data, a unique installation identifier, and a unique cluster identifier. This information allows each node to discover at boot time, the set of shared disks owned by the cluster to which the node belongs, including the cluster's master disk. Accordingly, a discovery record within a cluster's master disk is maintained in order to identify the cluster and the master disk to each node in the cluster.

In certain of the current cluster environments, a copy of the discovery record and the cluster bootstrap record is stored on each node's local storage within the cluster. However, there are drawbacks associated with the prior art storage of discovery and bootstrap records on local storage. One problem is the resolution of inconsistent copies of the discovery and cluster bootstrap records as stored on each node's local storage in the cluster. In a disaster recovery situation, restoration of backup copies of each node's local copy of their discovery and bootstrap records is required. This remains necessary as each node's unique discovery and cluster bootstrap records are maintained exclusively on that node's local storage media and failure to restore the proper discovery and cluster bootstrap records to the proper node may effect the function of the node and cluster. Therefore, backup and restoration functions require the backup and restoration of each node's discovery and cluster bootstrap records in order to accomplish a complete backup and restoration of the cluster system. In certain other cluster environments, an IP multicast address may be used for cluster discovery by querying on a well known multicast address with all other nodes responding to that query. The problem with this approach is that IP multicasting has network limitations and does not solve the storage discovery problem. Accordingly, there are limitations associated with storage of consistent copies of the bootstrap record and discovery information across multiple nodes in a cluster, as well as with the IP multicast address approach.

There is therefore a need to make the backup and restore of discovery and cluster bootstrap records transparent across the cluster to facilitate recovery of data. There is a further need to eliminate issues arising from maintaining inconsistent discovery and cluster bootstrap records when restoring a cluster or a node within a cluster.

SUMMARY OF THE INVENTION

This invention comprises a method and system for maintaining storage system discovery and cluster bootstrap information.

In a first aspect of the invention, a method for maintaining shared storage discovery information and cluster bootstrap information is provided. The method includes storing disk and cluster discovery information as a discovery record on a local storage media of a node and as a master disk of a shared storage system. In addition, cluster bootstrap information is stored on the master disk of the shared storage system as a cluster bootstrap record. When a change in cluster membership occurs, a method for updating the cluster bootstrap record may be implemented. The cluster bootstrap record update preferably includes a cluster leader performing a transactionally consistent disk update to the cluster bootstrap record and a distributed cache update to the cluster bootstrap record across the cluster.

In a second aspect of the invention, a data storage system with the disk and cluster discovery information stored as a record both on a local storage media of a node and on a master disk of a shared storage is provided, together with the cluster bootstrap information stored on the master disk of the shared storage as a cluster bootstrap record. A cluster leader is preferably adapted to conduct a modification to the bootstrap in the form of a transactionally consistent update and a distributed cache update in response to a change in cluster membership.

A third aspect of the invention is an article comprising a computer-readable signal bearing medium with means in the medium for storing local and remote copies of disk discovery and cluster discovery information as a discovery record, and means in the medium for remotely storing cluster bootstrap information as a cluster bootstrap record. The article also includes means in the medium for updating the cluster bootstrap record in a transactionally consistent manner in response to a change in cluster membership. The article may also include means in the medium for coordinating a distributed cache update across the cluster in response to the change in cluster membership.

In a fourth aspect of the invention, a method for maintaining data storage with a single operating instance running on a client node is provided. The method includes storing disk and cluster discovery information as a discovery record on a local storage media of the node. Cluster bootstrap information and the discovery record may be stored on a master disk of a shared storage system as a cluster bootstrap record, wherein the node is preferably in communication with the shared storage system. When a change in cluster membership occurs, the node may conduct a transactionally consistent disk update to the cluster bootstrap record and a distributed cache update to the cluster bootstrap record across the cluster.

In a fifth aspect of the invention, a client node adapted to run a single operating instance is provided with local storage media. Disk discovery and cluster information are adapted to be stored as a discovery record on the local storage media of the node. Cluster bootstrap information and the discovery record may be stored on a master disk of the shared storage system as a cluster bootstrap record, wherein the node is preferably in communication with the shared storage system. The node may conduct a transactionally consistent update to the cluster bootstrap record and a distributed cache update in response to a change in cluster membership.

A sixth aspect of the invention is an article comprising a computer-readable signal bearing medium with means in the medium for running a single operating system instance on a client node, and means in the medium for storing disk discovery and cluster information as a discovery record on local storage media of the node. The article may also includes means in the medium for remotely storing both cluster bootstrap information as a cluster bootstrap record and the discovery record. Preferably, the article includes means to coordinate a transactionally consistent update to the cluster bootstrap record in response to a change in cluster membership.

In a seventh aspect of the invention, a method for maintaining data storage is provided. The method includes storing disk and cluster information as a discovery record on a master disk of a shared storage system. In addition, cluster bootstrap information is stored on the master disk of the shared storage as a cluster bootstrap record. When a change in cluster membership occurs, a transactionally consistent update to the cluster bootstrap record and a distributed cache update is preferably conducted to reflect the change.

In an eight aspect of the invention, a data storage system having a shared storage system with a master disk is provided. Disk discovery and cluster information are adapted to be stored as a discovery record on the master disk of the shared storage. Cluster bootstrap information is adapted to be stored on the master disk of the shared storage as a cluster bootstrap record. A cluster leader from a cluster in communication with the shared storage preferably conducts a transactionally consistent update to the cluster bootstrap record and a distributed cache update in response to a change in cluster membership.

A ninth aspect of the invention is an article comprising a computer-readable signal bearing medium with means in the medium for storing disk discovery and cluster information as a record on a master disk of a shared storage system, and means in the medium for storing cluster bootstrap information on a master disk of the shared storage system as a cluster bootstrap record. The article also includes means in the medium for updating the cluster bootstrap record in a transactionally consistent manner in response to a change in cluster membership for a cluster in communication with the shared storage system. The article may also include means in the medium for coordinating a distributed cache update across a cluster in communication with shared storage system in response to the change in cluster membership.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Both disk discovery information and cluster discovery information are placed into a discovery record stored on a master disk of a shared storage system. In addition, the discovery record is copied from the master disk and stored on each node's local storage media as a node is added to the cluster. A cluster bootstrap record is created on the master disk of the shared storage system to store cluster bootstrap information. A transactionally consistent disk update algorithm is implemented to update the cluster bootstrap record in response to a change in cluster membership. In addition, a disaster recovery algorithm may be implemented to recover data from the shared storage when the shared storage system is not in communication with the cluster, as well as restoration of the cluster when the original cluster ceases to function. Accordingly, the structure for storage of both the discovery record and the bootstrap record provides the foundation to enable implementation of an efficient and reliable update to the cluster bootstrap record, as well as recovery of data and/or restoration of the cluster in the event either or both should cease to function.

Technical Details

Figure 1:
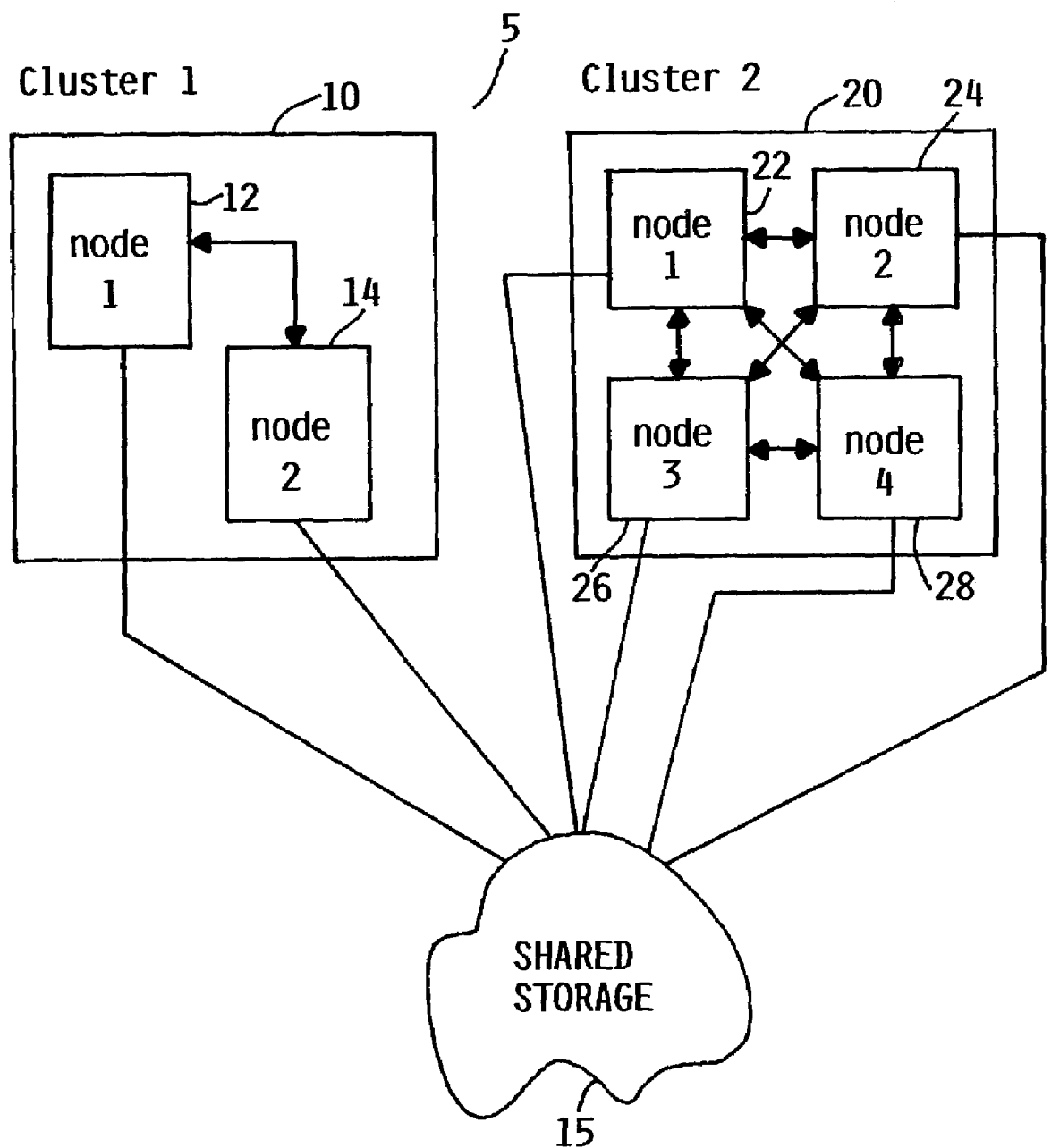
FIG. 1 is a prior art block diagram of a shared storage subsystem system in a multi cluster environment.

FIG. 1 is a block diagram 5 of a multinode computing environment having two clusters 10 and 20 and a shared storage system 15. The first cluster 10 includes two nodes 12 and 14, and the second cluster 20 includes four nodes 22, 24, 26, and 28. Each of the clusters 10 and 20 operates as a single homogeneous cluster environment. In the configuration shown here, both the nodes 12 and 14 in the first cluster 10 and the nodes 22, 24, 26, and 28 in the second cluster 20 are individually connected to the shared storage system 15. The interconnection of each of the nodes in the first cluster 10 and each of the nodes in the second cluster 20 with the shared storage system 15, allows each of the nodes in the clusters 10 and 20 to access the shared storage system. In a cluster environment, the shared storage system 15 may be partitioned to limit access of nodes in each cluster to designated sections of the storage media in the shared storage system. When the shared storage system is partitioned, each partition is assigned to a cluster with a master disk in the partition assigned to the cluster. Accordingly, FIG. 1 is an illustration of one form of a cluster environment showing the connection of each of the nodes in each cluster to the shared storage system.

Figure 9:
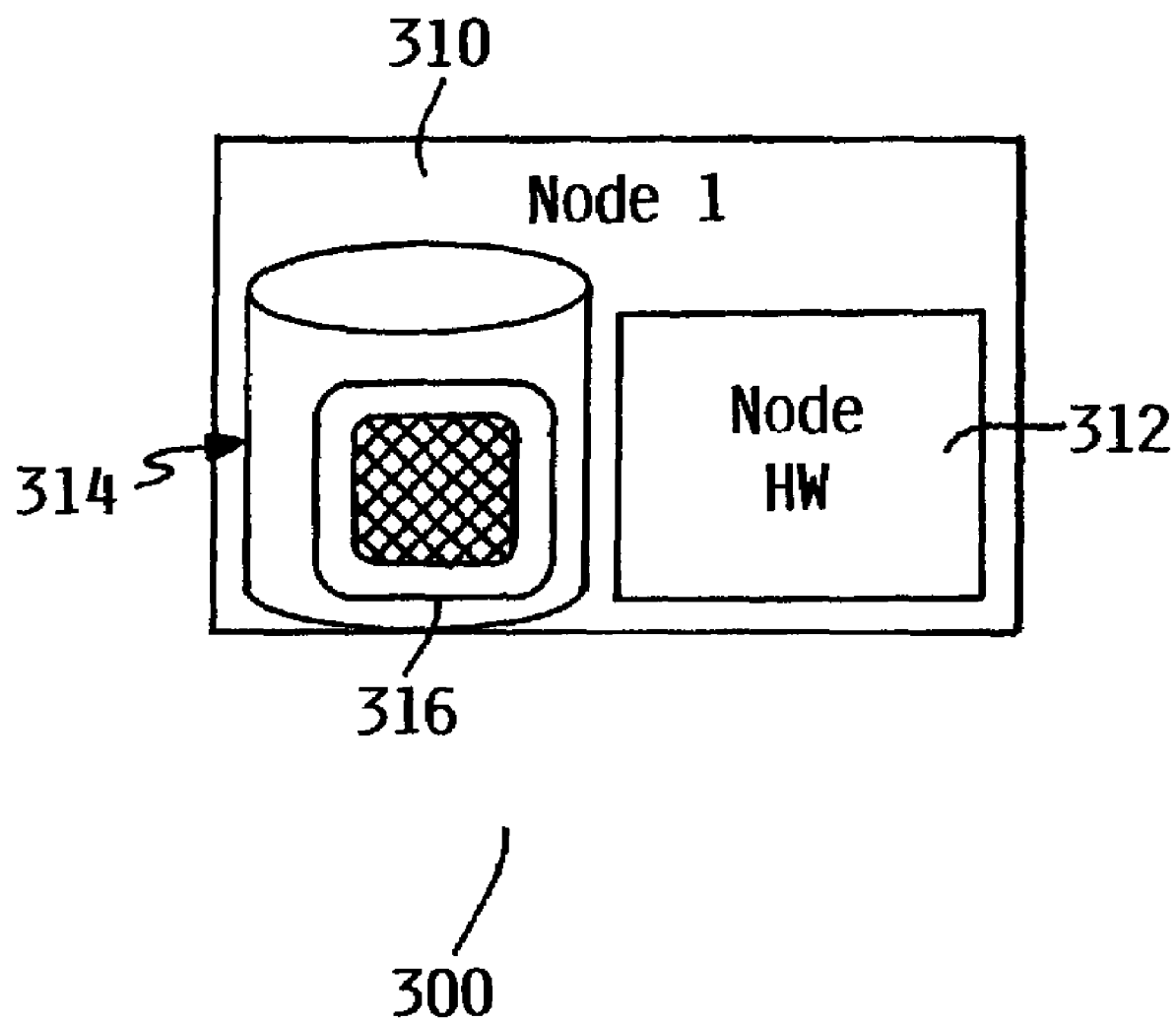
FIG. 9 is a block diagram of a single node configured according to a preferred embodiment of the invention.
Figure 10:
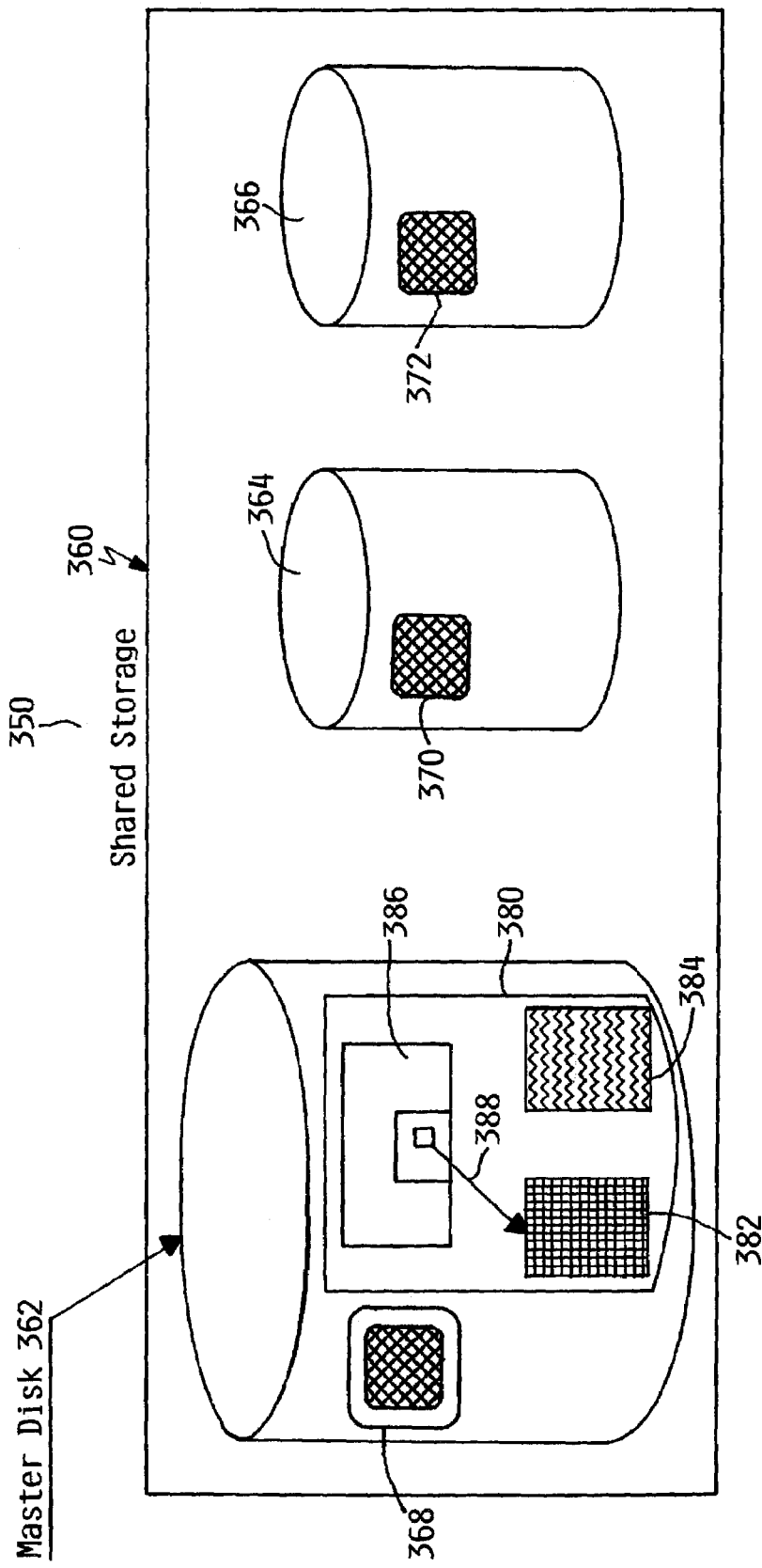
FIG. 10 is a block diagram of a shared storage system configured according to a preferred embodiment of the invention.

There are several different physical configurations of interconnected nodes and/or clusters in communication with a shared storage system. FIG. 9 is a block diagram 300 of a client node 310 according to the preferred embodiment of the invention. The client node 310 runs a single operating system instance. The node includes node hardware 312 and storage media 314. Disk discovery and cluster information are stored on the storage media of the node as a discovery record 316. FIG. 10 is a block diagram 350 of a shared storage system 360 according to the preferred embodiment of the invention. The shared storage system 360 has a master disk 362 and additional storage media 364 and 366. Disk discovery and cluster information are stored on the master disk 362 of the shared storage system 360 as a discovery record 368. In addition, cluster bootstrap information is stored on the master disk 362 of the shared storage system 360 as a cluster bootstrap record 380, and a shared disk label 370 and 372 is stored on each of the additional storage media 364 and 366, respectively. As shown in detail in FIG. 10, the cluster bootstrap record 380 is comprised of a consistent copy 382, a transient copy 384, and a static copy 386 with a pointer 388 to the consistent copy 382. In setting up a single node 310 or multiple nodes in a cluster environment with the shared storage system, the interconnection must allow for each node to access the shared storage media 362, 364, and 366. Accordingly, the discovery information is stored on both the master disk of the shared storage partition for the cluster as well as on the local storage media of each node as each node is added to the cluster.

In addition to storing the discovery record on the master disk of the shared storage media, a cluster bootstrap record is created and stored on the master disk of the shared storage media. As with the discovery record, all nodes in the cluster have access to the cluster bootstrap record. There are three copies of the cluster bootstrap record stored on the master disk, one static copy and two dynamic copies. The static copy pertains to all data that does not change over the life of the cluster except for a pointer field to the dynamic copy. This pointer field designates one of the dynamic copies of the record. The designated copy is referred to as a consistent copy of the dynamic copy of the bootstrap record, and the undesignated copy is referred to as a transient copy of the dynamic copy of the bootstrap record. Furthermore, each node in the cluster stores the static portion and the consistent copy of the dynamic portion of the cluster bootstrap record in memory, hereinafter referred to as the in-memory copies. Accordingly, the cluster bootstrap record is stored on the master disk of the shared storage media, and a copy of both the static portion and the consistent copy of the dynamic portion of the bootstrap record are stored in memory of each node in the cluster.

Figure 11A:
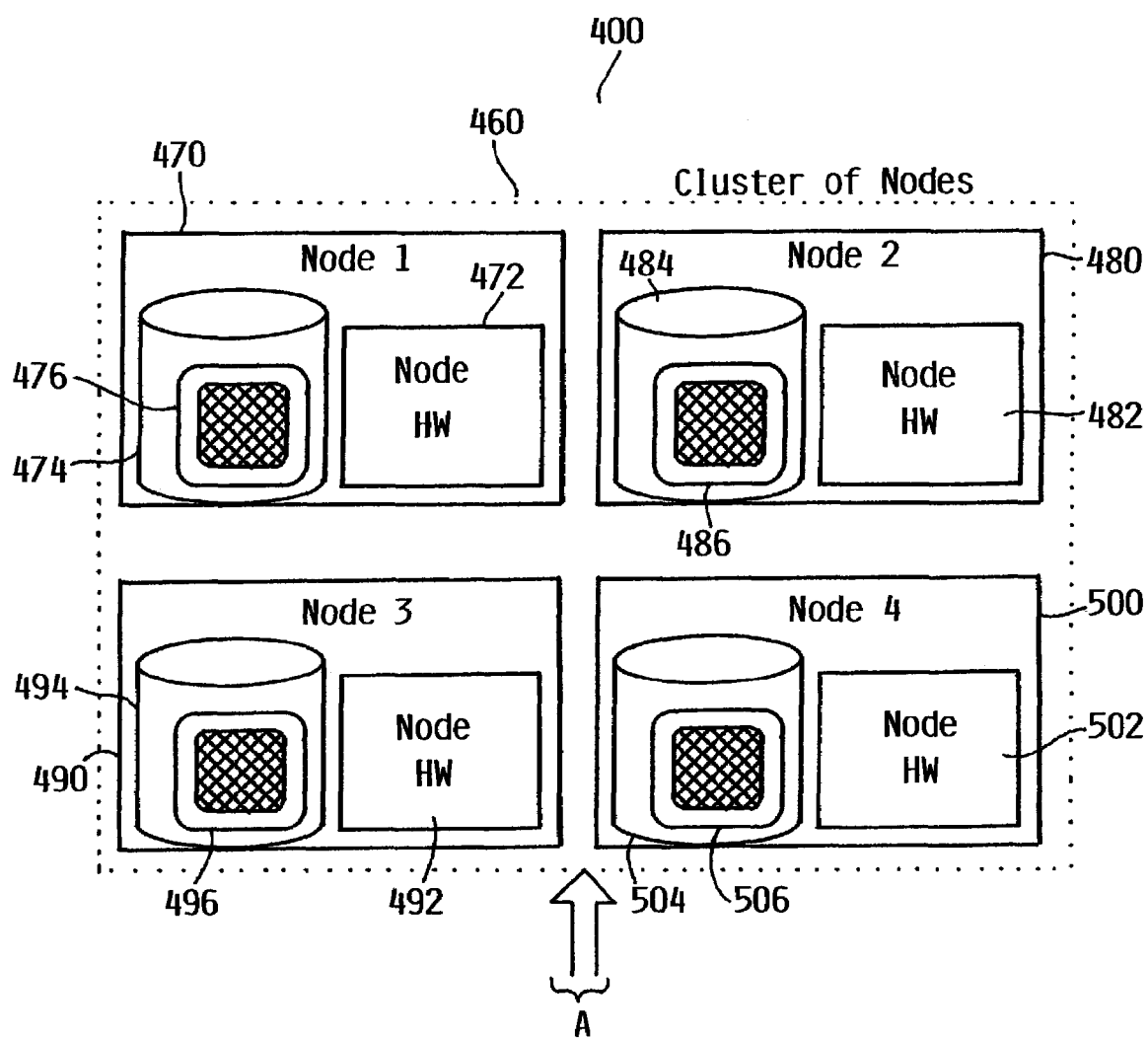
FIG. 11a is a block diagram of a multi-node system in communication with a shared storage system.
Figure 11B:
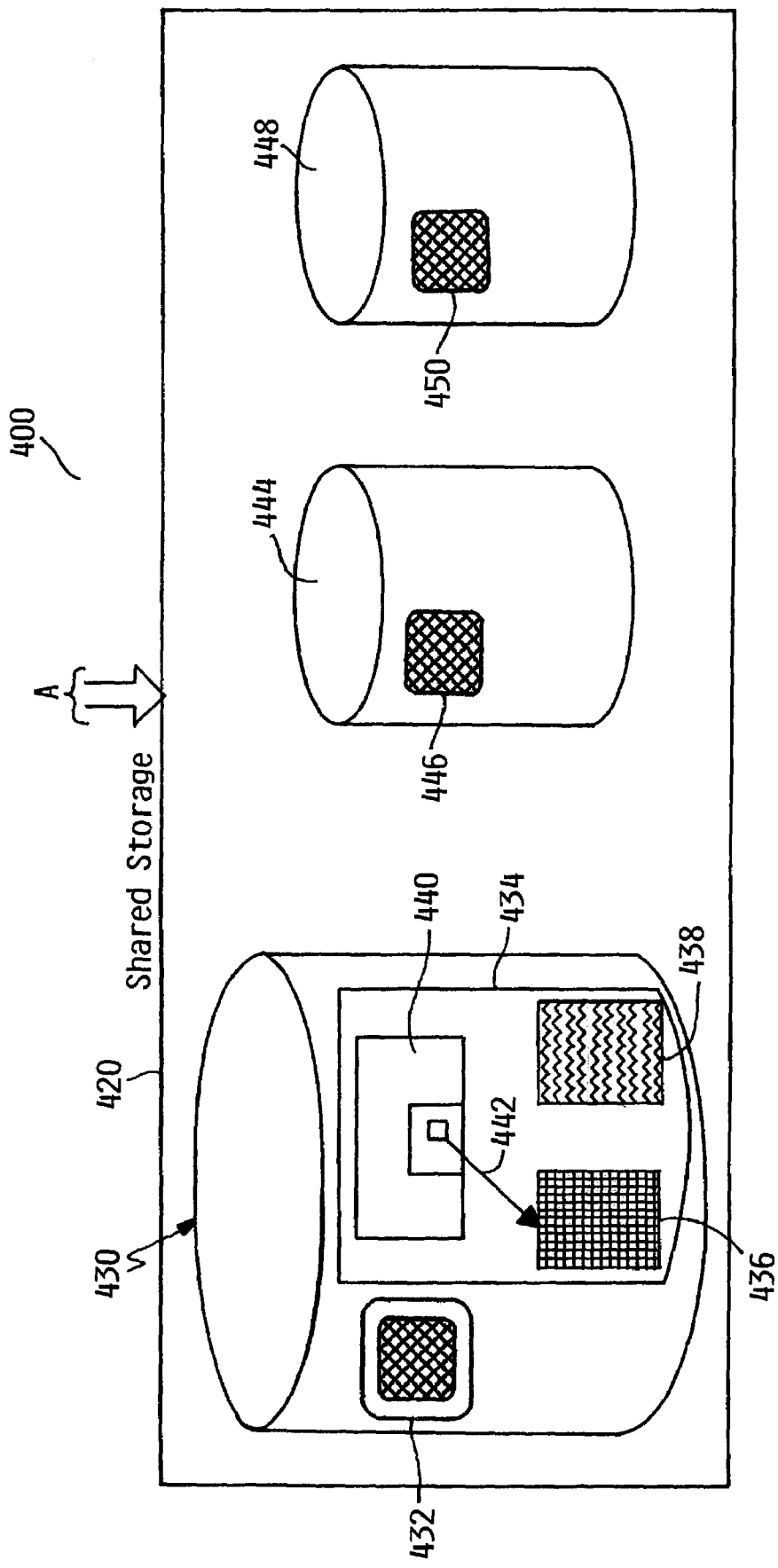
FIG. 11b is a block diagram of a multi-node system in communication with a shared storage system.

FIGS. 11a and 11b are block diagrams 400 of a shared storage system 420 in communication with a multi-node cluster 460. The shared storage 420 includes a master disk 430 and additional storage media 444 and 448. The master disk 430 includes disk discovery and cluster information stored thereon as a discovery record 432. In addition, cluster bootstrap information is stored on the master disk 430 of the shared storage system 420 as a cluster bootstrap record 440, and a shared disk label 446 and 450 is stored on each of the additional storage media 444 and 448, respectively. As shown in detail in FIG. 11b, the cluster bootstrap record 434 is comprised of a consistent copy 436, a transient copy 438, and a static copy 440 with a pointer 442 to the consistent copy 436. Each node 470, 480, 490, and 500 in the cluster 460 has associated node hardware 472, 482, 492, and 502, and local storage media 474, 484, 494, and 504. Disk discovery and cluster information are stored on the storage media of each node as a discovery record 476, 486, 496, and 506, respectively. In setting up a cluster environment with the shared storage system, the interconnection must allow for each node to access the shared storage media 420.

Each cluster has one node that functions as a cluster leader. The cluster leader owns certain tasks in the cluster for which communication with the leader for supporting a service is desired. In order to update the cluster bootstrap record to reflect any changes in the cluster, a single node must be elected or chosen as the cluster leader to perform the update. Essentially, the cluster leader manages the process of updating the cluster bootstrap record, and the remaining nodes in the cluster are limited to read access to the record.

Figure 2:
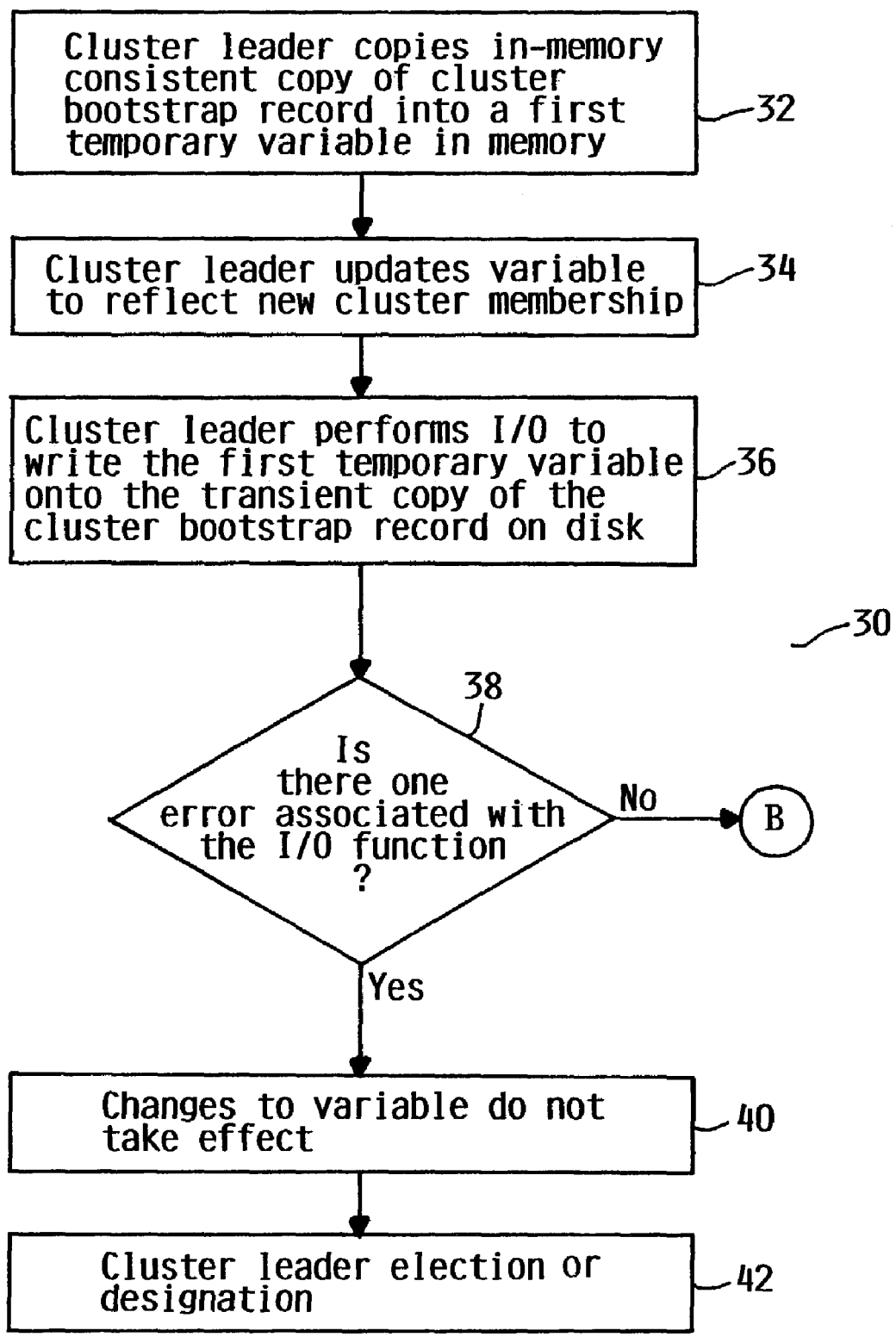
FIG. 2 is a flow diagram illustrating the first part of the process for performing an update to the cluster bootstrap record.

There are three phases in the process of updating the cluster bootstrap record. The first phase is referred to as the preprocessing phase, and it is initiated in response to the cluster leader becoming aware of a change in the cluster membership, which is indicative of a change in the cluster membership view. The cluster leader is responsible for managing the cluster membership view across the cluster and on the master disk in the shared storage media. FIG. 2 is a flow diagram 30 illustrating the first part of the process of performing an update to the cluster bootstrap record. The cluster leader copies an in-memory consistent copy of the cluster bootstrap record into a first temporary variable in memory 32. Thereafter, the cluster leader makes changes to the first temporary variable consistent with the changes that have occurred to the cluster membership 34. Following changes to the first temporary variable, the cluster leader performs an I/O function to write the first temporary variable onto the transient copy of the cluster bootstrap record on disk 36. A query 38 is conducted to determine if there is an error associated with the I/O function at step 36. If there is an error associated with the I/O function or a fault pertaining to the cluster leader, the changes to the first temporary variable will not take affect 40. A new cluster leader must be elected or chosen 42. Accordingly, the first phase in the process of updating the cluster bootstrap record pertains to making the change to the record in a temporary variable on the cluster leader and writing the changes to the transient copy of the dynamic portion of the cluster bootstrap record on the master disk of the shared storage media.

Figure 3:
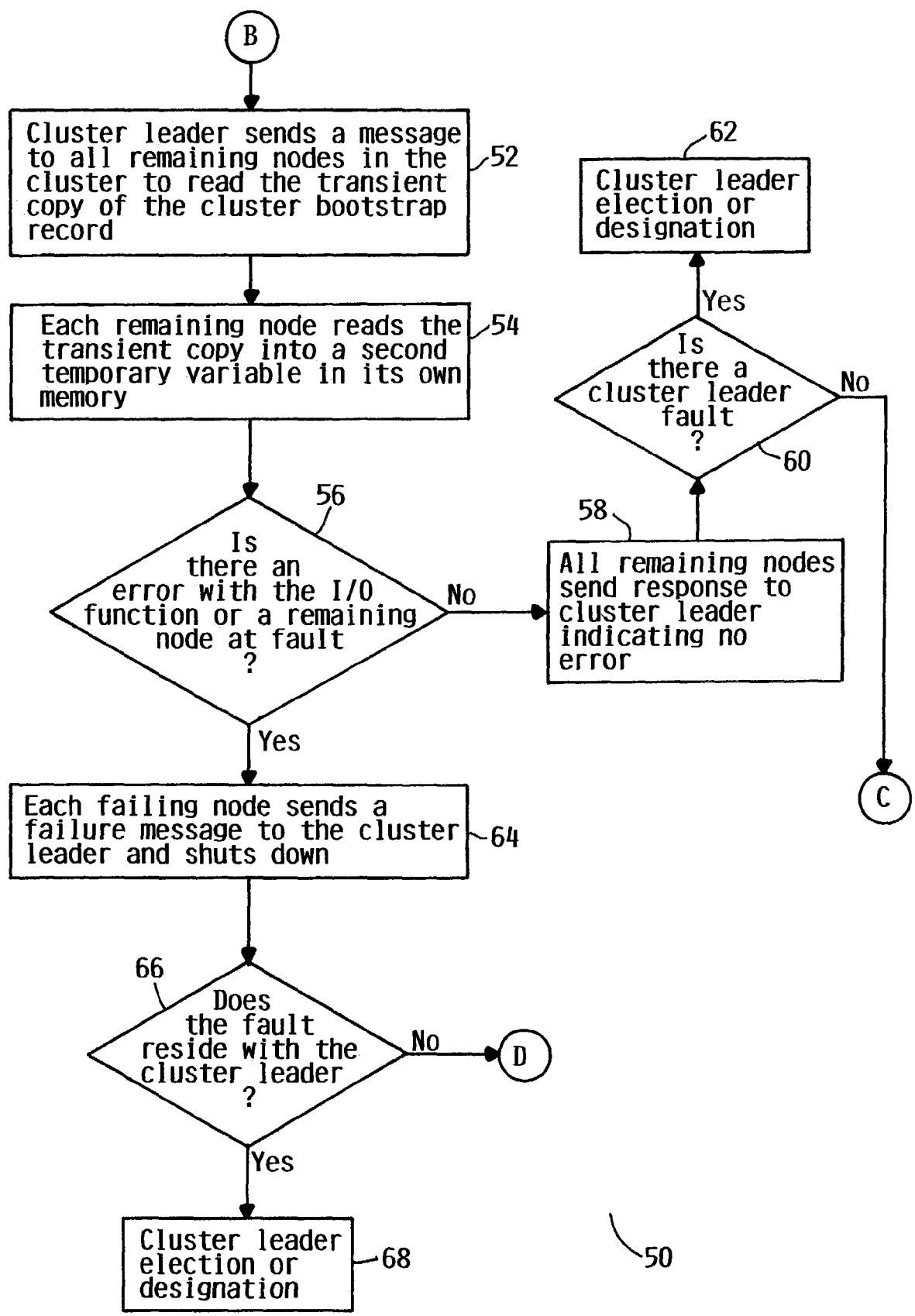
FIG. 3 is a flow diagram illustrating the second part of the process for performing an update to the cluster bootstrap record according to the preferred embodiment of this invention, and is suggested for printing on the first page of the issued patent.

FIG. 3 is a flow diagram 50 illustrating the second part of the process of performing an update to the cluster bootstrap record. Following successful completion of the first part of the process at step 38, the cluster leader sends a message to all remaining nodes in the cluster to read the transient copy of the dynamic portion of the bootstrap record on the master disk of the shared storage media 52. Upon receipt of the message from the cluster leader, each of the remaining nodes in the cluster reads the transient copy of the dynamic portion of the cluster bootstrap record on the master disk of the shared storage media into a second temporary variable in its own memory 54. The copy of the record in the second temporary variable is referred to as an in-memory transient copy of the cluster bootstrap record. A query 56 is conducted to determine if there is an error associated with the I/O function or a remaining node fault at step 54. If a response to the query at step 56 is negative, all of the remaining nodes of the cluster sends a response to the cluster leader indicating success in copying the dynamic portion of the cluster bootstrap record into their own memory as the second temporary variable 58. A query is then conducted to ensure that there is no fault associated with the functioning of the cluster leader 60. If the response to the query at step 60 is positive, a new cluster leader must be designated or elected 62. However, if the response to the query at step 60 is negative, this is an indication of maintenance of bi-lateral communication between each node in the cluster and the cluster leader. Thereafter, the second part of the update process is complete.

However, if there is an error associated with the I/O function or a remaining node fault at step 56, this is an indication that not all of the remaining nodes in the cluster were able to read the transient copy of the dynamic portion of the cluster bootstrap record on the master disk of the shared storage media into a second temporary variable in their own memory. Each of the nodes that fails at step 56, sends a failure message to the cluster leader and the failing node shuts down 64, if it is still operating. Alternatively, if the cluster leader fails to receive a response from any node in the cluster indicating success or failure in writing into the second temporary variable within a predefined time period, this is also indicative of a fault residing within an individual node or within the cluster leader. Thereafter, a query is conducted to determine if the fault resides in the cluster leader 66. If the response to the query at step 66 is positive and the fault is determined to reside in the cluster leader, then a new cluster leader must be designated or elected 68. However, if the response to the query at step 66 is negative and the fault is determined to reside in a node in the cluster that is not the cluster leader, the update to the cluster bootstrap record must be aborted because the update can not be performed across all of the nodes in the cluster. Accordingly, the second phase of the update to the cluster bootstrap records ensures that each of the remaining nodes in the cluster has been able to read the transient copy of the dynamic portion of the cluster bootstrap record on the master disk of the shared storage media into a second temporary variable in their own memory.

Figure 4:
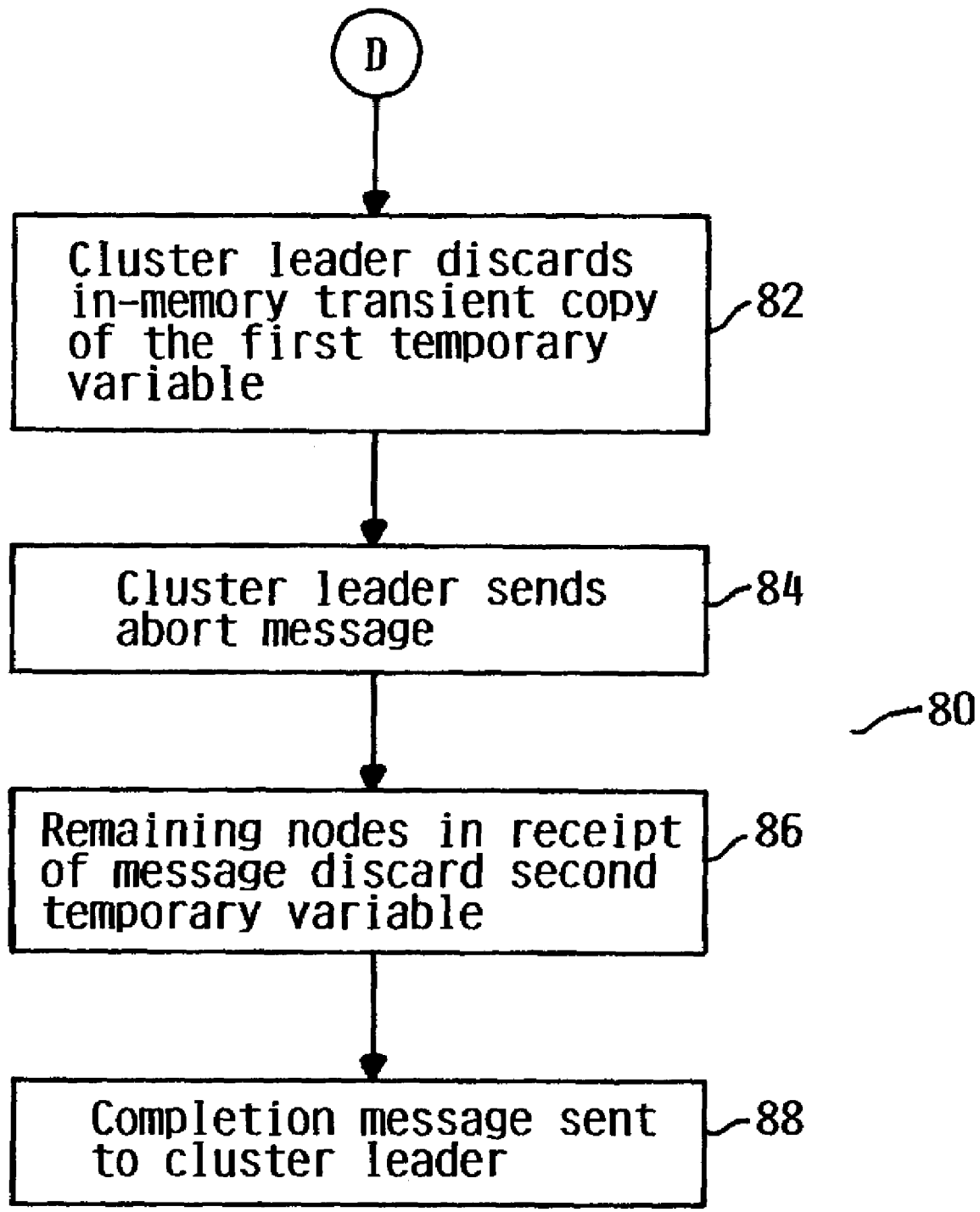
FIG. 4 is a flow diagram illustrating the abort process during the second part of the process for performing an update to the cluster bootstrap record.

FIG. 4 is a flow diagram 80 illustrating the process of aborting the process of updating the cluster bootstrap record during the second part of the cluster bootstrap record update process in response to the fault residing in one of the nodes in the cluster. The cluster leader discards the in-memory transient copy of the cluster bootstrap record in the first temporary variable in memory 82. Thereafter, the cluster leader sends a message to each remaining node in the cluster to abort the cluster bootstrap record update 84. Each of the remaining nodes that receives the message discards the second temporary variable 86 followed by a message to the cluster leader indicating completing of the discard process 88. Failure of the cluster leader to receive a response from a failing node within a predetermined time interval is an indication of a failing node and necessitates an update of the view of the entire cluster. Accordingly, the abort process ensures that cluster leader and each of the nodes in the cluster discards all temporary variable copies of the update to the cluster bootstrap record.

Figure 5:
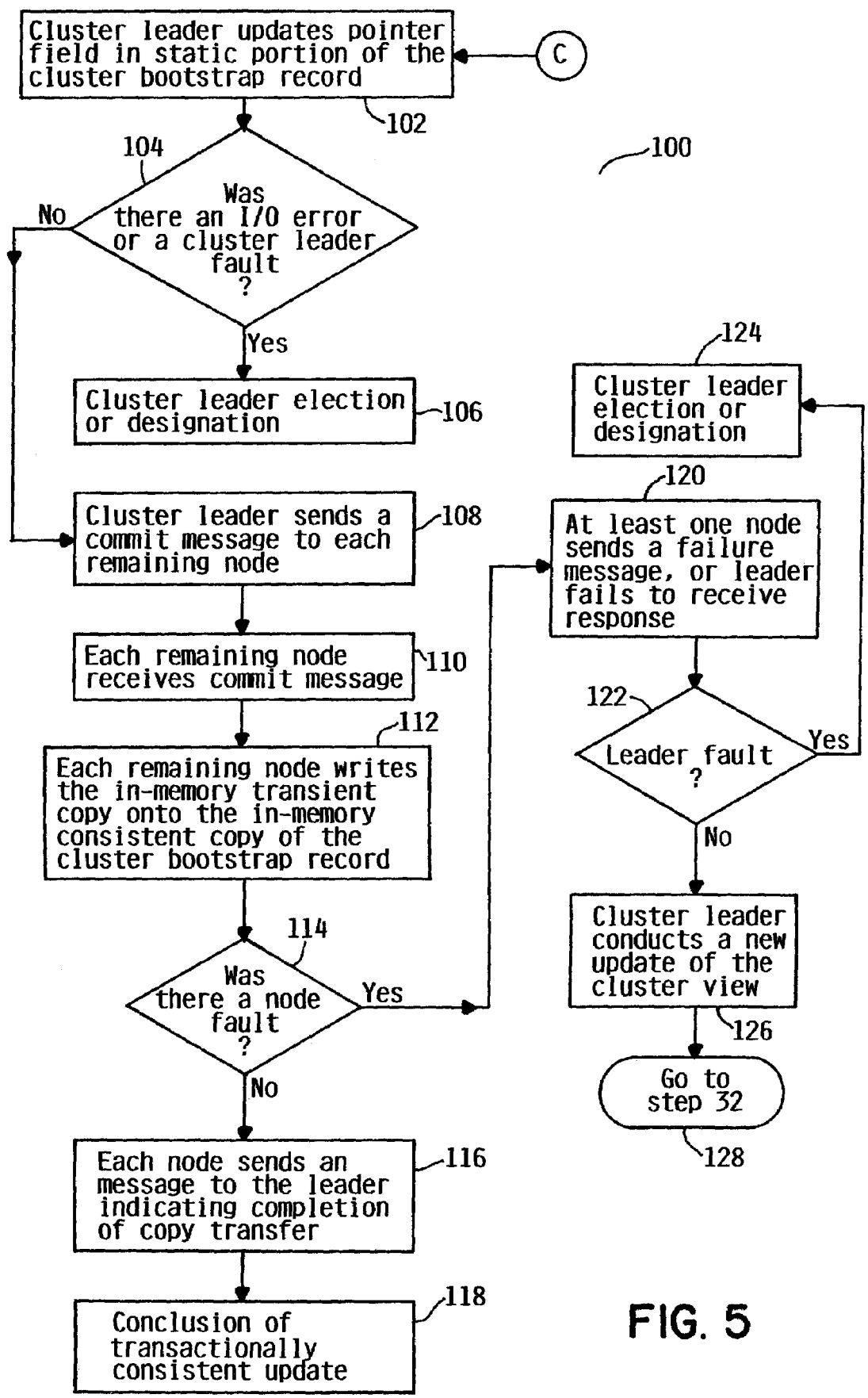
FIG. 5 is a flow diagram illustrating the process of committing the leader and each remaining node in the cluster to updating the cluster bootstrap record and completing the commit phase of the update to the cluster bootstrap record.

However, if at step 60 it is determined that there is no fault associated with the cluster leader, the cluster leader proceeds to complete the update of the cluster bootstrap record by sending a commit message to each remaining node. FIG. 5 is a flow diagram 100 illustrating the process of the cluster leader and each of the remaining nodes updating the cluster bootstrap record. The cluster leader updates the pointer field in the static copy of the cluster bootstrap record on the master disk in the shared storage media to point to the transient copy on the master disk 102. This process makes the transient copy of the cluster bootstrap record the new consistent copy of the cluster bootstrap record. In addition, this process make the previous consistent copy of the cluster bootstrap record on the master disk the new transient copy of the cluster bootstrap record. Thereafter, a query is conducted to determine if there was an I/O write error or a cluster leader fault associated with the update of the pointer 104. If the response to the query at step 104 is positive, the process proceeds to an election or designation of a new cluster leader 106. However, if the response to the query at step 104 is negative, the leader sends a commit message to each of the remaining nodes in the cluster indicating commitment to the updated bootstrap record 108. Each of the remaining nodes in the cluster receives the commitment message 110. Subsequently, each of the remaining nodes in the cluster writes the in-memory transient copy of the update to the cluster bootstrap record onto an in-memory consistent copy of the cluster bootstrap record 112. This process effectively makes the in-memory transient copy of the cluster bootstrap record the new consistent copy of the cluster bootstrap record. Following step 112, a query is conducted to determine if a fault occurred with one of the remaining nodes 114. A negative response to the query at step 114 will result in each remaining node in the cluster sending a message to the cluster leader indicating successful completion of the conversion of the in-memory transient copy of the cluster bootstrap record into the new consistent copy 116. This essentially concludes the transactionally consistent update 118. However, a positive response to the query at step 114 may take the form of either one or more of the remaining nodes in the cluster sending a failure response to the cluster leader, or the failure of the cluster leader to receive a response from one or more of the remaining nodes within a predefined time interval 120. If either form of a failure is communicated to the cluster leader, a query is conducted to determine if there is a fault associated with the node assigned to function as the cluster leader 122. A loss of the cluster leader will require election or designation of a new cluster leader 124. Whereas, a fault associated with one of the remaining nodes enables the cluster leader to conduct a new update of the cluster view 126 and return to step 32 at 128 to initiate the process of updating the cluster bootstrap record. Accordingly, a failure at step 114 enables the commit process to be aborted prior to completing the update of the cluster bootstrap record on the distributed cache in the cluster.

In addition to enabling a transactionally consistent update of the cluster bootstrap record in response to a change in cluster membership, the organization and storage of both the discovery record and the cluster bootstrap record enables a more efficient recovery and restoration of a cluster and/or shared storage should such a procedure be required. Regardless of the level of recovery necessary, the following algorithm assumes that a backup of the shared storage is available to be restored onto an alternative storage media, and an alternative cluster of nodes is available to replace a failed cluster of nodes.

Figure 6:
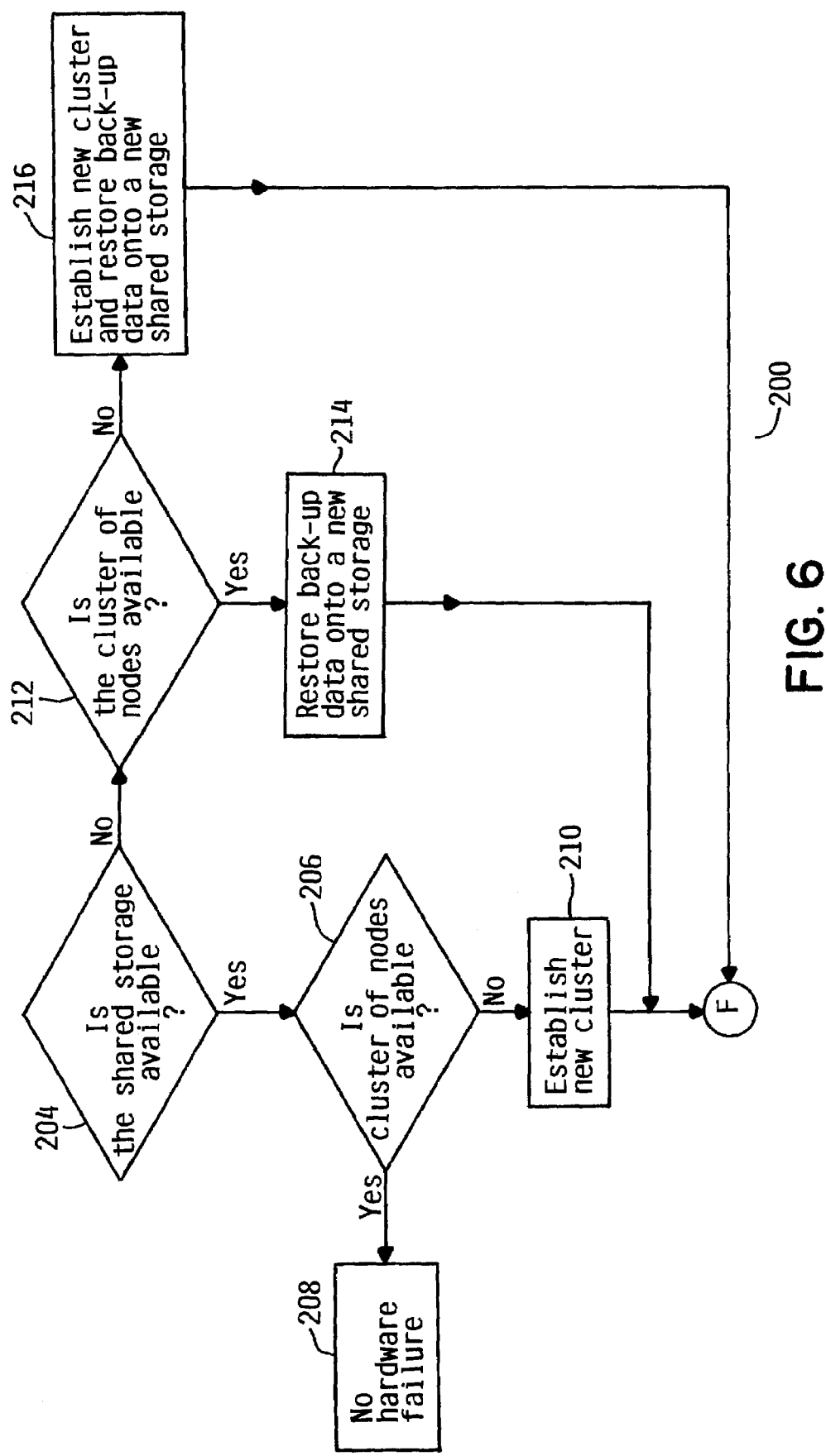
FIG. 6 is a flow diagram illustrating the process of assessing the required recovery of the cluster and/or shared storage.

FIG. 6 is a flow diagram 200 showing the steps in assessing the required recovery of the cluster and/or shared storage. The first step in recovery is to determine the level of hardware failure that has occurred. At step 204, a query is conducted to determine if the shared storage is available. If the response to the query at step 204 is positive, a subsequent query is conducted to determine if the cluster of nodes is available 206. A positive response to the query at step 206 is indicated that there is no hardware failure associated with either the cluster or the shared storage 208. However, a negative response to the query at step 206 is an indication of a failure of the cluster, which requires a new cluster to be established with a new set of nodes and associated network communication and hardware 210. Alternatively, if the response to the query at step 204 is negative, a second query is conducted to determine if the cluster of nodes is available 212. A positive response to the second query 212 is indicative of a potential mismatch between the cluster and the cluster bootstrap record, which requires a restore of backed up data onto a new shared storage system 214. However, a negative response to the second query 212 is indicative of unavailability of both the cluster of nodes and the shared storage. If both the cluster of nodes and the shared storage media are unavailable, a new cluster of nodes must be established, followed by a restore of back-up data onto a new shared storage media 216. Accordingly, the first step in recovery is to determine whether the cluster and/or storage media is available.

Figure 7:
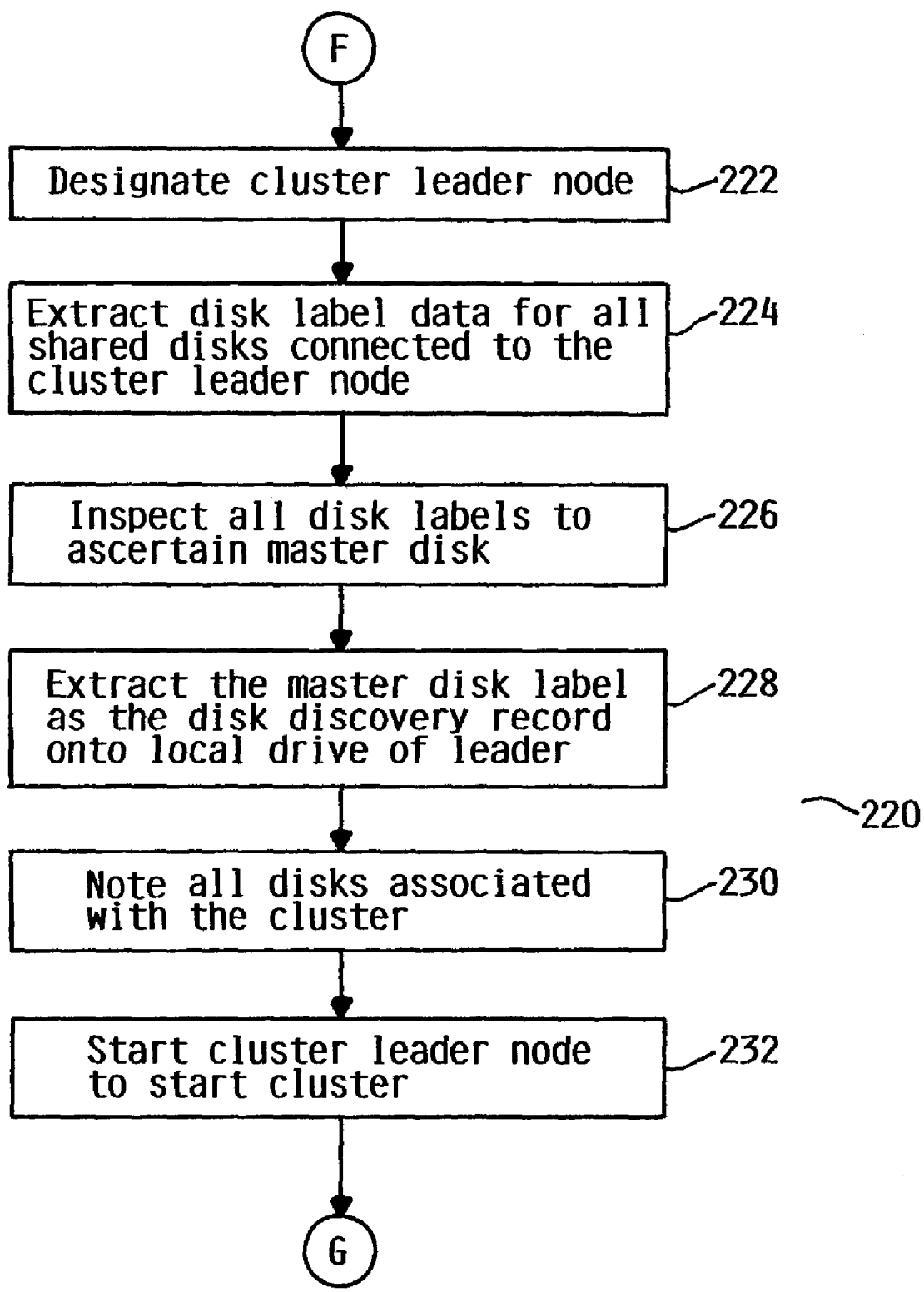
FIG. 7 is a flow diagram illustrating the process of hardware recovery.

Following assessment of the set up of a new set of nodes in FIG. 6, recovery is initiated. FIG. 7 is a flow diagram 220 illustrating the process of recovery for the cluster and/or shared storage. Every disk has a record with an identifier known as a disk label, wherein the disk label contains a unique installation identifier, a unique cluster identifier, and the type of the disk, i.e. master disk or system disk. The cluster leader node in the cluster is designated 222. A disk label extraction tool residing on the cluster leader is used to inspect all shared disk connected to the cluster leader node 224. Disk label data for all of the disks in the shared storage media that are in communication with the cluster leader is extracted 226. The process of extracting disk label data assists in identifying the master disk assigned to the cluster, as well as the other disks in the shared storage assigned to the cluster, for installation purposes. All of the extracted disk labels are inspected to ascertain the master disk 228. The master disk label is then extracted to become the cluster and shared storage discovery record, and is placed on a local storage media of the cluster leader node 230. All disks from the shared storage media associated with the cluster are identified 232. If the shared storage media is partitioned, the disks associated with this specific cluster must be identified as such. Thereafter, the cluster leader node software is started to startup operation of the cluster 234.

Figure 8:
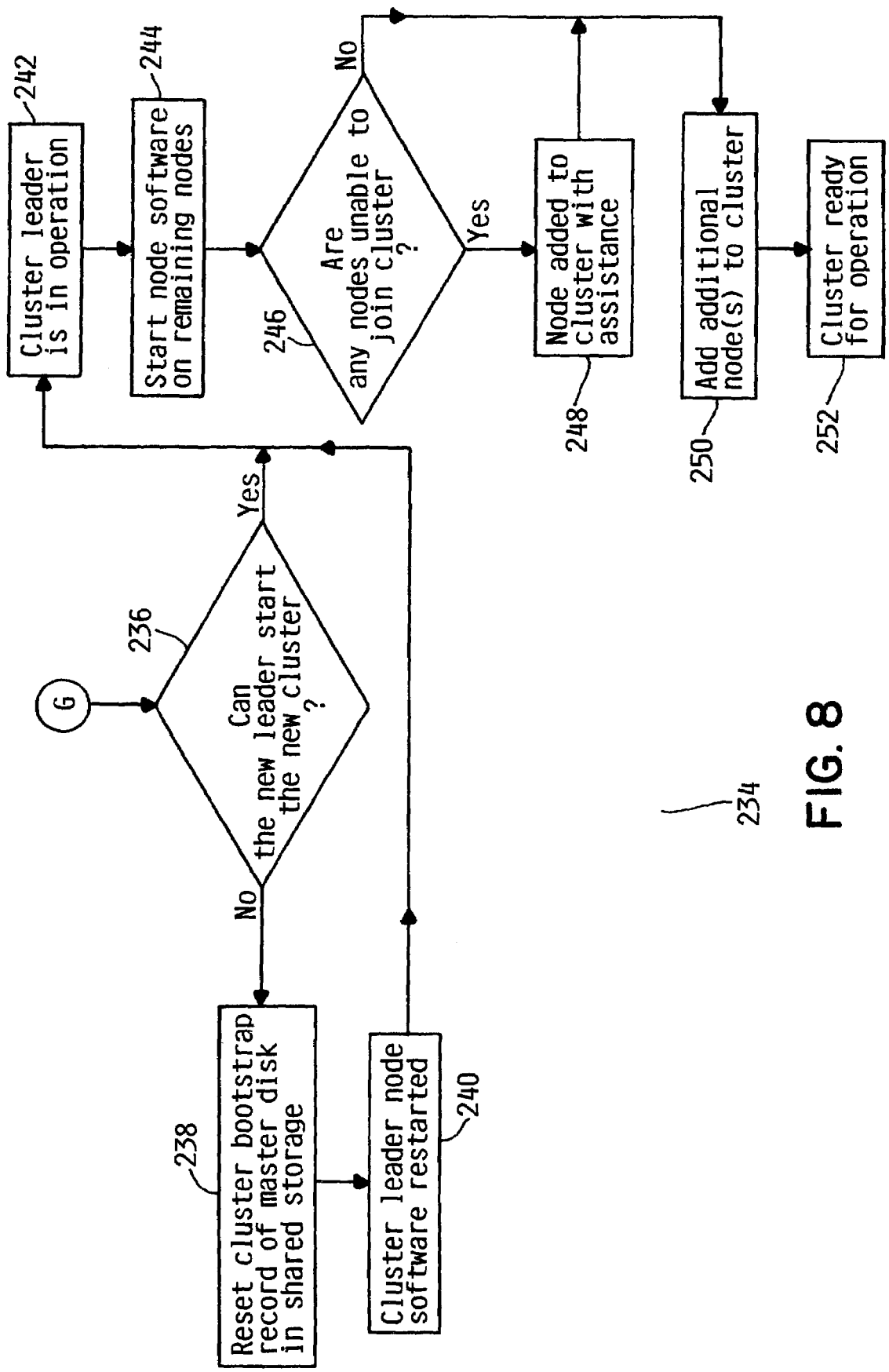
FIG. 8 is a flow diagram illustrating the process of cluster recovery.

FIG. 8 is a flow diagram 234 illustrating the continuing process of starting the cluster following a cluster failure. Following initial startup of the cluster at step 232, a query is conducted to determine if the new cluster leader is able to startup the new cluster 236. If the response to the query at step 236 is negative from a disaster following the paths of steps 210 and 216, a tool is invoked to reset the cluster bootstrap record on the master disk in the shared storage media 238. This process deletes all cluster node member information from the bootstrap record. Thereafter, the cluster leader node software is restarted 240. However, if a response to the query at step 236 is positive from a disaster following the scenarios emanating from step 214, or if the cluster leader node software has been restarted from step 236, a cluster leader is in operation 242. Cluster software on remaining nodes is started 244. A query is then conducted to determine if any of the nodes attempting to join the cluster are unable to become part of the cluster due to a mismatch of membership in the cluster bootstrap record 246. If the response to the query at step 246 is positive for a node originating from steps 210 and 216 which is unable to join the cluster, the node is then added to the cluster with the assistance of the cluster leader 248. A tool is invoked during the process of adding a node to the cluster to create a disk discovery record on the local media of the node joining the cluster. Following a negative response to the query at step 246 for a node originating from the scenario at step 214 or the assistance of the cluster leader at step 248, the cluster with all of it's nodes is ready to receive additional nodes 250 and the cluster is ready for operation 252. Accordingly, the disaster recovery illustrated in FIGS. 7, 8, and 9 enables establishment of a new cluster with a restoration of the shared storage media.

Advantages Over the Prior Art

The method and system described herein provides a technique for storing disk discovery and cluster bootstrap records in a reliable and transparent manner. The storage of the disk discovery and cluster information enables the information to be extracted from the shared storage system if a copy stored on a local node is missing or unavailable. The method for updating the cluster bootstrap record takes advantage of the structure of the storage of the disk discovery and the cluster bootstrap records to provide a highly resilient process. An I/O error at any point in the process allows the leader to terminate the process and leave the remaining nodes in the cluster with the last consistent copy of the cluster bootstrap record in place. A fault in the cluster leader or any of the nodes in the cluster that could result in a termination in the process of updating the cluster bootstrap record will also leave the cluster membership view consistent. With respect to recovery in the event of a cluster failure or shared storage system failure, data can be recovered and a cluster can be re-established with a backup source of the data, local or remote, and with usage of extraction tools for setup of a new cluster. No backup of local storage media files or records is required. Accordingly, the transparent structure of both the disk discovery and cluster bootstrap records mitigates issues in cluster maintenance arising from inconsistent copies of the records across the cluster.

Alternative Embodiments

It will be appreciated that, although specific embodiments of the invention have been described herein for purposes of illustration, various modifications may be made without departing from the spirit and scope of the invention. In particular, a single copy of the cluster configuration record may be placed on the master disk next to or as a part of the cluster bootstrap record. When a back-up of the shared storage media is conducted, both the cluster bootstrap record and the cluster configuration record are backed up as well. At the time of a restore operation, the most recent copy of the backup is obtained. Accordingly, the scope of protection of this invention is limited only by the following claims and their equivalents.

We claim:

1. A method for maintaining storage system discovery and cluster bootstrap information comprising:
   storing shared storage discovery and cluster information as a single discovery record on a local storage media of a node and on a master disk of a shared storage system; and
   storing cluster bootstrap information on said master disk of said shared storage system as a cluster bootstrap record.

2. The method of claim 1, further comprising updating said cluster bootstrap record in response to a change in cluster membership.

3. The method of claim 2, wherein the step of updating said cluster bootstrap record includes a cluster leader performing a transactionally consistent disk update to said cluster bootstrap record and a distributed cache update to said cluster bootstrap record across said cluster.

4. The method of claim 2, wherein the step of updating said cluster bootstrap record includes a cluster leader copying a consistent cache copy of said bootstrap record into a first temporary variable in memory and making changes in said first temporary variable to reflect new cluster changes.

5. The method of claim 4, further comprising storing said first temporary variable into a current transient copy of said cluster bootstrap record on disk.

6. The method of claim 5, further comprising said cluster leader sending a message to all remaining nodes in said cluster to read said current transient copy of said bootstrap record from said master disk in said shared storage system in said cluster into a second temporary variable.

7. The method of claim 6, further comprising said cluster leader updating a pointer in a static section of said cluster bootstrap record on disk enabling said current transient copy of said bootstrap record to become a new consistent copy upon receipt from said remaining nodes of successful reading of said current transient copy of said bootstrap record from disk.

8. The method of claim 7, further comprising said remaining nodes completing a distributed cache update across said cluster by copying said second temporary variable in memory into a consistent cache copy in memory.

9. The method of claim 6, further comprising aborting update of said cluster bootstrap record upon observance of a failure.

10. The method of claim 9, wherein the step of aborting update of said cluster bootstrap record includes said cluster leader discarding said first temporary variable in memory and said remaining nodes discarding said second temporary variable.

11. The method of claim 1, further comprising extracting master disk label information from a master disk of said shared storage onto a local storage media of a cluster leader as a new disk discovery record in response to unavailability selected from the group consisting of: a previous cluster of nodes, said storage system, and combinations thereof.

12. The method of claim 1, further comprising resetting a cluster of nodes using a new disk discovery record in response to unavailability selected from the group consisting of: a previous cluster of nodes, said storage system, and combinations thereof.

13. A data storage system comprising:
   disk discovery and cluster information stored as a single record on a local storage media of a node and on a master disk of a shared storage system;
   cluster bootstrap information stored on said master disk of said shared storage system as a cluster bootstrap record.

14. The system of claim 13, further comprising a cluster leader adapted to conduct a transactionally consistent update to said cluster bootstrap record and a distributed cache update in response to a change in cluster membership.

15. The system of claim 14, wherein said transactionally consistent update to said cluster bootstrap record includes a cluster manager to direct said cluster leader to copy a consistent cache copy of said bootstrap record into a first temporary variable in memory.

16. The system of claim 15, wherein said cluster leader is adapted to receive a communication to amend said first variable to reflect said change in cluster membership and to store said amended variable in a current transient copy of the cluster bootstrap record on said shared storage.

17. The system of claim 16, wherein node members of said cluster are adapted to receive a communication from said cluster leader to read said current transient copy from disk into a second temporary variable.

18. The system of claim 17, further comprising said current transient copy assigned to function as a new consistent copy of said bootstrap record in response to a communication from said node members of a positive read of said current transient copy of said bootstrap record from disk.

19. The system of claim 17, further comprising a discard of said first temporary variable by said cluster leader and a discard of said second temporary variable by said nodes in response to a failure in a remaining node.

20. The system of claim 13, further comprising a cluster manager adapted to extract master disk label information from a master disk of said shared storage onto a local storage media of a cluster leader as a new disk discovery record in response to unavailability selected from the group of: of use of nodes in said cluster, the storage system, and combinations thereof.

21. The system of claim 14, wherein a cluster of nodes is adapted to be reset with a new disk discovery record in response to unavailability selected from the group consisting of: a previous cluster of nodes, said storage system, and combinations thereof.

22. An article comprising:
   a computer-readable medium;
   means in the medium for storing local and remote copies of disk discovery and cluster information as a single discovery record;
   means in the medium for remotely storing cluster bootstrap information as a cluster bootstrap record; and
   means in the medium for updating said cluster bootstrap record in a transactionally consistent manner in response to a change in cluster membership.

23. The article of claim 22, wherein the medium is a recordable data storage medium.

24. The article of claim 22, further comprising means in the medium for coordinating a distributed cache update across said cluster in response to said change in cluster membership.

25. The article of claim 22, wherein said means for updating said cluster bootstrap record in a transactionally consistent manner in response to a change in cluster membership includes a cluster leader to communicate with nodes in said cluster and to conduct said update in response to a receipt from said nodes of a positive read of a current transient copy of said cluster bootstrap record from disk.

26. The article of claim 22, further comprising means in the medium for recovery of storage data and a cluster of nodes in response to unavailability.

27. A method for maintaining a data storage system, comprising:
    running a single operating system instance on a client node; and
    storing disk discovery and cluster information as a single discovery record on a local storage media of said node.

28. The method of claim 27, further comprising storing cluster bootstrap information and said discovery record on a master disk of a shared storage system in communication with said node as a cluster bootstrap record.

29. The method of claim 28, further comprising said node conducting a transactionally consistent update to said cluster bootstrap record and a distributed cache update in response to a change in cluster membership.

30. The method of claim 28, further comprising extracting master disk label information from said master disk onto said local storage media of said node as a new disk discovery record in response to unavailability of said shared storage system.

31. The method of claim 28, further comprising resetting said node using a new disk discovery record in response to unavailability selected from a group consisting of:
    said node, a cluster of nodes in communication with said storage system, said shared storage system, and combinations thereof.

32. A data storage system comprising:
    a client node adapted to run a single operating system instance; and
    disk discovery and cluster information adapted to be stored as a single discovery record on a local storage media of said node.

33. The system of claim 32, wherein said node is adapted to communicate with a shared storage system.

34. The system of claim 33, further comprising cluster bootstrap information and said discovery record adapted to be stored on a master disk of said shared storage system as a cluster bootstrap record.

35. The system of claim 34, further comprising said node adapted to conduct a transactionally consistent update to said cluster bootstrap record and a distributed cache update in response to a change in cluster membership.

36. The system of claim 33, wherein said node is adapted to extract master disk label information from a master disk of said shared storage onto said local storage media as a new disk discovery record in response to unavailability of said shared storage system.

37. An article comprising:
    a computer-readable medium;
    means in the medium for running a single operating system instance on a client node; and
    means in the medium for storing disk discovery and cluster information as a single discovery record on a local storage media of said node.

38. The article of claim 37, wherein the medium is a recordable data storage medium.

39. The article of claim 37, further comprising means in the medium for remotely storing cluster bootstrap information as a cluster bootstrap record, and said disk discovery record.

40. The article of claim 39, further comprising means in the medium for coordinating a transactionally consistent update to said cluster bootstrap record in response to a change in cluster membership.

41. The article of claim 37, further comprising means in the medium for recovery of storage data and said node in response to unavailability.

42. A method for maintaining a data storage system, comprising:
    storing disk discovery and cluster information as a single record on a master disk of a shared storage system; and
    storing cluster bootstrap information on said master disk of said shared storage system as a cluster bootstrap record.

43. The method of claim 42, further comprising a cluster in communication with said shared storage.

44. The method of claim 43, further comprising updating said cluster bootstrap record in response to a change in cluster membership.

45. The method of claim 44, wherein the step of updating said cluster bootstrap record includes a cluster leader performing a transactionally consistent disk update to said cluster bootstrap record and a distributed cache update to said cluster bootstrap record across said cluster.

46. The method of claim 42, further comprising extracting disk label information from a master disk of said shared storage onto a local storage media of a cluster leader as a new disk discovery record in response to unavailability selected from a group consisting of: a previous cluster, said storage system, and combinations thereof.

47. The method of claim 42, further comprising resetting a cluster using a new disk discovery record in response to unavailability selected from a group consisting of:
    a previous cluster, said storage system, and combinations thereof.

48. A data storage system comprising:
    a shared storage system comprising a master disk;
    disk discovery and cluster information adapted to be stored as a single discovery record on said master disk of said shared storage system; and
    cluster bootstrap information adapted to be stored on said master disk of said shared storage system as a cluster bootstrap record.

49. The data storage system of claim 48, further comprising a cluster leader from a cluster in communication with said shared storage adapted to conduct a transactionally consistent update to said cluster bootstrap record and a distributed cache update in response to a change in cluster membership.

50. The data storage system of claim 48, further comprising a cluster manager from said cluster adapted to extract master disk label information from said master disk of said shared storage onto a local storage media of a cluster leader as a new disk discovery record in response to unavailability selected from a group consisting of:
    use of said node, said storage system, and combinations thereof.

51. An article comprising:
    a computer-readable medium;
    means in the medium for storing disk discovery and cluster information as a single discovery record on a master disk of a shared storage system; and
    means in the medium for storing cluster bootstrap information on said master disk of said shared storage system as a cluster bootstrap record.

52. The article of claim 51, wherein the medium is a recordable data storage medium.

53. The article of claim 51, further comprising means in the medium for updating said cluster bootstrap record in a transactionally consistent manner in response to a change in cluster membership for a cluster in communication with said shared storage system.

54. The article of claim 51, further comprising means in the medium for coordinating a distributed cache update across a cluster in communication with said storage system in response to a change in cluster membership.

* * * * *